Patented Jan. 16, 1945

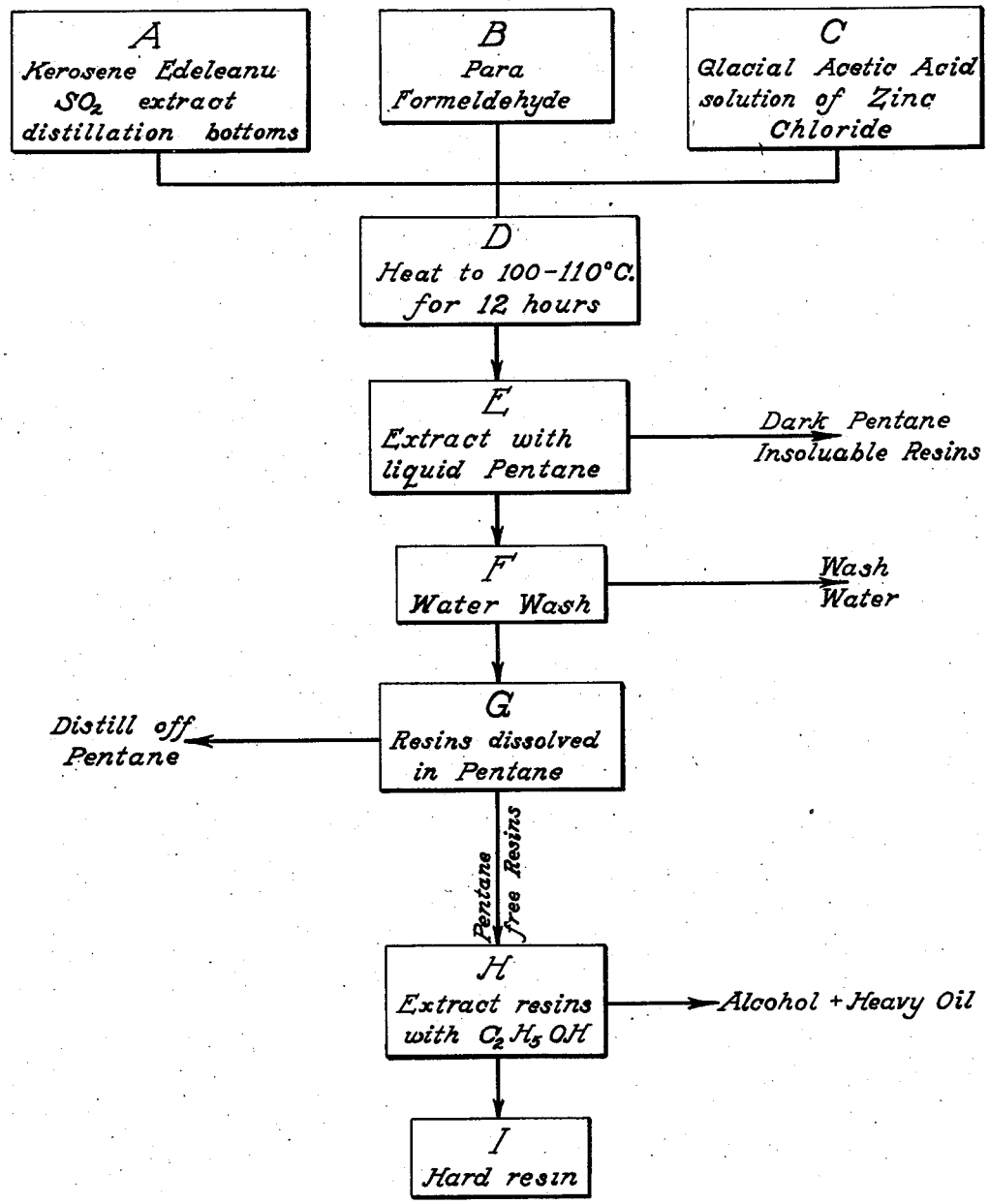

2,367,183

UNITED STATES PATENT OFFICE 2,367,183

PROCESS FOR THE PRODUCTION OF SYNTHETIC RESINS

Alva C. Byrns, Palos Verdes Estates, Calif., assignor to Union Oil Company of California, Los Angeles, Calif., a corporation of California Application October 28, 1940, Serial No. 363,085

4 Claims. (Cl. 260—67)

This invention relates to a process for the production of synthetic resins from certain petroleum fractions. Furthermore, the invention comprises novel methods of purifying and fractionating the above mentioned resins.

One of the earliest investigators to produce synthetic resins from petroleum fractions was Nastyukoff. His process, now known as the "Formolite reaction," consisted in mixing a petroleum fraction with concentrated sulfuric acid and subsequently adding aqueous formaldehyde solution, the resin precipitating as formed. The material was insoluble in light hydrocarbon solvents, such as petroleum ether. More recently S. C. Fulton and A. H. Gleason, Industrial and Engineering Chemistry, March, 1940, have described a procedure for producing synthetic resins from aromatic petroleum fractions. Essentially, the process comprises reacting aromatic hydrocarbons obtained from petroleum distillates with para-formaldehyde for a period of about six to sixteen hours in the presence of a 10% solution of zinc chloride dissolved in glacial acetic acid. As the reaction progresses the crude resin gradually separates from the solution. At the end of the reaction period the resin is dissolved in an inert hydrocarbon and washed with water to remove impurities such as acetic acid and the solvent subsequently removed by distilling to about 250° C. under a twenty inch vacuum. The resin so obtained is insoluble in petroleum ether. Furthermore, in order to obtain a product of acceptable color, the petroleum fraction must be treated, usually with concentrated sulfuric acid followed by re-distillation.

I have discovered a method whereby the resins, produced by reacting aromatic hydrocarbons with formaldehyde or para-formaldehyde in the presence of a catalyst, such as zinc chloride dissolved in glacial acetic acid or a catalyst such as sulfuric acid or ferric chloride will have properties vastly superior to those described by previous investigators. My process can be readily understood by referring to the accompanying figure.

Referring to the figure, kerosene Edeleanu extract distillation bottoms in A are mixed with para-formaldehyde withdrawn from B and 10% of zinc chloride dissolved in glacial acetic acid withdrawn from C in container D. This mixture in container D is maintained at a temperature between 100 and 110° C. for a period of approximately twelve hours. At the end of this period the resins formed in D are transferred to container E where they are mixed at ordinary room temperature (in the neighborhood of 70° F.) with from two to five volumes of liquid pentane per volume of crude resin. As a result of this treatment there is formed a precipitate of dark insoluble material which is allowed to settle from the pentane solution, and the latter then decanted from the precipitate to container F. The pentane solution in container F is thoroughly washed with water for the removal of any zinc chloride or glacial acetic acid which may remain therein. The water washed pentane solution of resin is then transferred to G where the pentane is removed by distillation.

The pentane free resins in G are then transferred to H where they are extracted with a low boiling alcohol, such as methyl or ethyl alcohol for the removal of any heavy oil which is present. The extracted resins in H are then transferred to I where any remaining alcohol is removed by ordinary distillation means. I have also found that the alcohol extraction step may be omitted if desired and in its place I may use ordinary vacuum distillation preferably with steam for the removal of oils present in the resins.

As a result of the foregoing process I obtain a resin which is substantially free from dark colored materials by reason of the pentane extraction described above. Furthermore, the resins are also free from heavy oils by reason of the alcohol extraction or the vacuum distillation. These resins differ from those of the prior art since they are soluble in pentane, soluble in turpentine and compatible in all proportions with soya bean oil and blown linseed oil and relatively insoluble in all the lower boiling alcohols, such as methyl or ethyl alcohol.

If reference is made to the article by Gleason and Fulton, mentioned above, it will be noted that under the heading "properties" the resins produced by these two investigators were insoluble in the lower alcohols, petroleum ether and partly so in naptha. The resins which I have produced are not only completely soluble in the hydrocarbon solvents mentioned but are also completely soluble in liquid pentane. Furthermore, if reference is made to United States Letters Patent No. 898,307 to Rene Bohn it will be noted that the resins produced by that investigator by the reaction of naphthalene with formaldehyde in the presence of sulfuric acid were insoluble in alcohol and turpentine, whereas, the resins which I have produced, as explained above, are insoluble in the lower alcohols but very soluble in turpentine.

As a specific example of carrying out my process to produce my novel resin, 2,000 ml. of topped kerosene extract obtained by sulfur dioxide extraction of a California kerosene distillate and subsequent distillation to give a bottoms fraction boiling mainly between 400 and 500° F. were refluxed at a temperature of 100 to 110° C. for twenty-four hours with a mixture of 2,000 ml. of glacial acetic acid, 200 grams of zinc chloride and 350 grams of para-formaldehyde. At the end of this period the mixture was slowly distilled until 200 ml. of aqueous acetic acid were obtained together with a few drops of oil.

The crude resin produced according to the foregoing procedure was then diluted with liquid pentane in the proportion of five volumes of liquid pentane to one volume of the reaction mass. After thorough agitation this mixture of pentane and crude resin was allowed to stand for a period of twenty-four hours. At the end of this period the pentane solution of resin was decanted away from the insoluble residue. This pentane solution of resin was then thoroughly washed three times with 2,000 ml. proportions of distilled water. After separation of the wash water from the pentane solution of resins the pentane was removed from the resin by ordinary distillation.

In the foregoing example I have described the use of normal pentane as the solvent to fractionate the crude resin into a pentane insoluble fraction which is discarded and a pentane soluble fraction from which I derive the finished resin. I may use other low boiling paraffinic hydrocarbons such as liquid butane, propane or ethane or mixtures thereof or I may use relatively low boiling paraffinic naphthas such as petroleum ether. By the term "paraffinic naphthas" I also mean to include the low boiling naphthenic hydrocarbons such as cyclohexane but I definitely exclude the aromatic solvents. These low boiling paraffinic hydrocarbons do not dissolve the dark colored undesirable resins present in the reaction mass containing the crude resins.

The resin remaining in the distillation flask after the removal of the pentane was then extracted with about four volumes of 95% ethyl alcohol. The alcohol solution consisted mostly of oily material together with a small quantity of resin. The resin, remaining as a precipitate after the alcohol extraction, was then heated for the removal of any remaining alcohol. As described above, the alcohol extraction can be substituted by distillation for the removal of the unreacted or only partially condensed oil present in the partially purified resin.

The resin produced by the foregoing process is a light colored brittle solid which is completely soluble in pentane and turpentine and relatively insoluble in low boiling alcohols, such as ethyl or methyl alcohol. This material is useful for such purposes as mastic flooring, floor tile, varnishes, printing ink, linoleum, rubber cement, water proofing, etc.

While I have described my process in connection with a specific petroleum fraction, I do not wish to limit myself to the use of this material as the only source of aromatic hydrocarbons which can be employed. I have discovered that while kerosene sulfur dioxide extract bottoms produce resins having highly desirable qualities that these resins may also be produced from the extracts of gas oil as well as light, medium and heavy lubricating oil distillates. Although I do not wish to be limited by the theory, I believe that the unusual properties of the resins I have produced are due to the condensation of alkyl substituted mono-cyclic aromatic compounds with alkyl substituted by-cyclic aromatic compounds using formaldehyde. The kerosene extract fraction employed was essentially comprised of these two types of compounds. Similar resins are obtained by condensation of alkyl substituted mono-cyclic aromatic compounds with alkyl substituted poly-cyclic aromatic compounds using formaldehyde as the condensing agent. The aromatic fractions which I employ are substantially free from olefins which also distinguish them from the raw materials employed by the earlier investigators. For example, Fulton has described the use of cracked petroleum fractions for use in the production of resins. These cracked petroleum fractions contain substantial quantities of olefins which greatly influence the nature of the resins produced. I prefer to obtain my aromatic hydrocarbons from petroleum fractions which are uncracked and which have been produced by straight distillation with the aid of steam since these fractions are substantially free of olefins.

It will also be noted that I have described the use of para-formaldehyde only in some of the experiments which I have performed. I have found that while aqueous formaldehyde does not react as readily with the aromatic hydrocarbons, nevertheless it can be used.

The process which I have described above employs zinc chloride dissolved in glacial acetic acid as the catalyst. I have also found that I may use other catalysts, such as ferric chloride or concentrated sulfuric acid, however, the zinc chloride dissolved glacial acetic acid is preferred.

I claim:

1. A process for the production of synthetic resin which comprises heating a substantially olefin-free alkylated aromatic hydrocarbon mixture of alkyl substituted monocyclic and polycyclic aromatics with formaldehyde in the presence of a condensation catalyst consisting of zinc chloride dissolved in acetic acid, thereby forming a reaction mass containing crude resin, contacting said crude resin with a low boiling paraffinic hydrocarbon solvent selected from the class consisting of pentane, butane, propane, and ethane and thereby forming an insoluble resinous phase and a soluble phase comprising resin dissolved in said solvent, separating said phases, washing the solvent phase with water, removing the solvent from said solvent phase and subsequently removing the resinous fraction recovered from said solvent phase.

2. A process as set forth in claim 1, in which oily fractions are removed from the resin by extraction with a low boiling aliphatic alcohol from the class consisting of methanol and ethanol.

3. A process for the production of synthetic resin which comprises heating to a temperature between about 100 and 110° C. a substantially olefin-free alkylated hydrocarbon kerosene Edeleneau extract distillation bottoms with formaldehyde in the presence of a condensation catalyst consisting of zinc chloride dissolved in acetic acid, thereby forming a reaction mass containing crude resin, contacting said crude resin with a low boiling pentane hydrocarbon solvent and thereby forming an insoluble resinous phase and a soluble phase comprising resin dissolved in said solvent, separating said phases, washing the solvent phase with water, removing the solvent from said solvent phase and subsequently removing the resinous fraction recovered from said solvent phase.

4. A process as claimed in claim 3, in which oily fractions are removed from the resin by extraction with a low boiling aliphatic alcohol from the class consisting of methanol and ethanol.

ALVA C. BYRNS.